United States Patent
Naseh et al.

(10) Patent No.: US 8,243,588 B2
(45) Date of Patent: *Aug. 14, 2012

(54) DISASTER RECOVERY FOR ACTIVE-STANDBY DATA CENTER USING ROUTE HEALTH AND BGP

(75) Inventors: Zeeshan Naseh, Santa Clara, CA (US); Vinay Gundi, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 466 days.

This patent is subject to a terminal disclaimer.

(21) Appl. No.: 12/420,241

(22) Filed: Apr. 8, 2009

(65) Prior Publication Data

US 2009/0201800 A1    Aug. 13, 2009

Related U.S. Application Data

(63) Continuation of application No. 11/065,871, filed on Feb. 25, 2005.

(51) Int. Cl.
*H04L 12/26* (2006.01)

(52) U.S. Cl. ............ 370/219; 370/221; 370/395.31; 709/224; 709/239

(58) Field of Classification Search .......... 370/216–221, 370/395.31; 709/223–226, 238, 239, 243, 709/250

See application file for complete search history.

(56) References Cited

U.S. PATENT DOCUMENTS

| | | | |
|---|---|---|---|
| 5,774,668 A | 6/1998 | Choquier et al. | |
| 5,951,694 A | 9/1999 | Choquier et al. | |
| 6,173,324 B1 | 1/2001 | D'Souza | |
| 6,182,139 B1 | 1/2001 | Brendel | |
| 6,714,549 B1 | 3/2004 | Phaltankar | |
| 6,760,775 B1 | 7/2004 | Anerousis et al. | |
| 6,785,737 B2 | 8/2004 | Lee et al. | |
| 6,963,575 B1 | 11/2005 | Sistanizadeh et al. | |
| 7,174,389 B2 | 2/2007 | Orava et al. | |
| 7,197,573 B1 * | 3/2007 | Jacobson et al. | 709/239 |
| 7,225,270 B2 * | 5/2007 | Barr et al. | 709/238 |
| 7,260,645 B2 | 8/2007 | Bays | |
| 7,286,479 B2 * | 10/2007 | Bragg | 709/238 |
| 7,505,401 B2 | 3/2009 | Kashyap | |
| 7,609,619 B2 | 10/2009 | Naseh et al. | |
| 7,710,865 B2 | 5/2010 | Naseh et al. | |
| 7,769,886 B2 | 8/2010 | Naseh et al. | |
| 2002/0124080 A1 | 9/2002 | Leighton et al. | |
| 2002/0162027 A1 * | 10/2002 | Itwaru | 709/225 |
| 2002/0163910 A1 | 11/2002 | Wisner et al. | |

(Continued)

OTHER PUBLICATIONS

Testa, S.; Chou, W.; , "The distributed data center: front-end solutions," IT Professional , vol. 6, No. 3, pp. 26-32, May-Jun. 2004 doi: 10.1109/MITP.2004.24, all pgs.*

(Continued)

*Primary Examiner* — Jeffrey M Rutkowski

(74) *Attorney, Agent, or Firm* — Schwegman, Lundberg & Woessner, P.A.

(57) ABSTRACT

The present invention provides an active/standby data center that avoids the delay associated with a cached DNS entry to switch from the active data center to the standby data center. When the active data center becomes unavailable, the standby data center advertises the same address as the primary data center so the change over occurs quickly. When the IP address of the primary data center is no longer visible to the standby data center, the standby data center begins to advertise.

15 Claims, 3 Drawing Sheets

U.S. PATENT DOCUMENTS

| | | | |
|---|---|---|---|
| 2003/0039212 | A1 | 2/2003 | Lloyd et al. |
| 2003/0067924 | A1 | 4/2003 | Choe et al. |
| 2003/0118024 | A1 | 6/2003 | Lee et al. |
| 2003/0233473 | A1 | 12/2003 | Bonhomme et al. |
| 2004/0008700 | A1 | 1/2004 | Visser et al. |
| 2004/0042396 | A1 | 3/2004 | Brown et al. |
| 2004/0085965 | A1 | 5/2004 | Fotedar |
| 2004/0090913 | A1* | 5/2004 | Scudder et al. ............... 370/219 |
| 2004/0143662 | A1 | 7/2004 | Poyhonen et al. |
| 2004/0215752 | A1 | 10/2004 | Satapati et al. |
| 2004/0218584 | A1 | 11/2004 | Brown |
| 2004/0257983 | A1 | 12/2004 | Kopp et al. |
| 2005/0010653 | A1 | 1/2005 | McCanne |
| 2005/0047413 | A1 | 3/2005 | Ilnicki et al. |
| 2005/0068968 | A1 | 3/2005 | Ovadia et al. |
| 2005/0080923 | A1 | 4/2005 | Elzur |
| 2005/0089015 | A1 | 4/2005 | Tsuge et al. |
| 2006/0036761 | A1 | 2/2006 | Amra et al. |
| 2006/0050719 | A1 | 3/2006 | Barr et al. |
| 2006/0126496 | A1* | 6/2006 | Filsfils et al. ............... 370/216 |
| 2006/0193252 | A1 | 8/2006 | Naseh et al. |
| 2006/0195607 | A1 | 8/2006 | Naseh et al. |

OTHER PUBLICATIONS

Bartell et al., "Effective BGP Policy Control", Jan. 23, 2004, all pgs.*

"Business Ready Data Center", Copyright 1992-2005, Cisco Systems, Inc., San Jose, CA, USA, 2 pgs.

"CSM One-Arm Design in the Data Center", Copyright 2004, Version 2.0, Cisco Systems, Inc., San Jose, CA, USA, 22 pgs.

"Data Center Design and Implementation with Cisco Catalyst 6500 Service Modules", Copyright 2004, Version 2.0, Cisco Systems, Inc., San Jose, CA, USA, (2004), 88 pgs.

"On-Line Education", *International Engineering Consortium,* Copyright 2005, Cisco Systems, Inc., San Jose, CA, USA, 2 pgs.

"Policy-Based Routing", Copyright 1996, Cisco Systems, Inc., San Jose, CA, USA, 1-7.

"Release Notes for Catalyst 6500 Series Content Switching Module Software Release 3.1(9)", Copyright 2004, Sofware Release 3.1(9), Cisco Systems, Inc., San Jose, CA, USA, (Nov. 2004), 68 pgs.

"Removing Content Switching Performance Barriers: A Discussion of the Cisco CSM Pipelined Network Processor Architecture", Copyright 1992-2002, Cisco Systems, Inc., San Jose, CA, USA, 1-20.

"Routing Basics, Internetworking Technologies Handbook", Copyright 1992-2002, Cisco Systems, Inc., San Jose, CA, USA, (Feb. 20, 2002), 1-10.

"Virtual LAN Security Best Practices", Copyright 1992-2002, Cisco Systems, Inc., San Jose, CA, USA, 1-13.

"What's A Netmask? And Why Do I Need One?", http://www.johnscloset.net/primer/subnet.html, (Apr. 21, 2000), 3 pages.

Brennen, "The Name Service How to", Copyright 2004, version 0.04, 1-20.

Katabi, et al., "A Framework for Scalable Global IP-Anycast (GIA)", *MIT Laboratory for Computer Science,* Cambridge, MA, USA, This research was supported by the US Defense Advanced Research Projects Agency (DARPA) under contract No. N66001-98-1-8903, 13 pgs.

Morrissey, P., "Multihoming with BGP4", *Network Computing,* vol. 10. No. (25), (Dec. 1999), 117 pg.

Semeria, "Understanding IP Addressing: Everything You Ever Wanted to Know", Copyright 2001, 3Com Corporation, Santa Clara, CA, USA, 76 pgs.

U.S. Appl. No. 11/065,871, Non-Final Office Action mailed May 15, 2008, 19 pgs.

U.S. Appl. No. 11/065,871, Response filed Oct. 22, 2008 to Non-Final Office Action mailed May 15, 2008, 11 pgs.

U.S. Appl. No. 11/065,871, Notice of Allowance mailed Dec. 16, 2008, 12 pgs.

U.S. Appl. No. 11/065,871, Notice of Allowance mailed Jul. 13, 2009, 15 pgs.

* cited by examiner

DISASTER RECOVERY FOR ACTIVE-STANDBY DATA CENTER USING ROUTE HEALTH AND BGP

RELATED APPLICATIONS

This application is a continuation of U.S. patent application Ser. No. 11/065,871, filed on Feb. 25, 2005, which is related to the following co-pending and commonly assigned U.S. patent applications: Ser. No. 11/067,037, filed on Feb. 25, 2005, entitled "Active-Active Data Center Using RHI, BGP, and IGP Anycast for Disaster Recovery and Load Distribution"; and Ser. No. 11/066,955, filed on Feb. 25, 2005, entitled "Application Based Active-Active Data Center Network Using Route Health Injection and BGP"; the disclosures of which are incorporated herein by reference for all purposes.

COPYRIGHT NOTICE

A portion of the disclosure recited in the specification contains material that is subject to copyright protection. Specifically, documents provided with this application include source code instructions for a process by which the present invention is practiced in a computer system. The copyright owner has no objection to the facsimile reproduction of the specification as filed in the Patent and Trademark Office. Otherwise, all copyright rights are reserved.

BACKGROUND OF THE INVENTION

The present invention relates to a data center topology that can recover from a disaster and more particularly to an improved disaster recovery method in the event the active data center malfunctions.

A data center stores information related to a particular business, provides global access to the information and application software through a plurality of computer resources and may include automated systems to monitor server activity, network traffic and performance. A data center may be known by a variety of names such as, by way of example, a server farm, hosting facility, data farm, data warehouse, co-location facility, co-located server hosting facility, corporate data center, managed data centers, internet hotel, internet service provider, application service provider, full service provider, wireless application service provider, site or other data network facility. Regardless of the name used, a typical data center houses computer resources such as mainframe computers; web, application, file and printer servers executing various operating systems and application software, storage subsystems and network infrastructure. A data center may be either a centralized data center or a distributed data center interconnected by either a public or private network.

A centralized data center provides a single data center where the computer resources are located. Because there is only one location, there is a saving in terms of the number of computer resources required to provide services to the user. Because there is only one location, management of the computer resources is much easier and capital and operating costs are reduced. Unfortunately, centralized data centers are rarely capable of providing the necessary reliability required under common service level agreements for a geographically diverse organization and the service is susceptible to interruption in the event of a disaster, such as a fire or earthquake, equipment malfunction or denial of service attack. For these reasons, centralized data centers are rarely relied upon for critical applications.

A distributed data center is one that locates computer resources at geographically diverse data centers. The use of multiple data centers provides critical redundancy, albeit at higher capitol and operating costs, business continuity, disaster recovery, and load-sharing solutions. Some distributed data centers use Domain Name System (DNS) for managing business continuance and load sharing between multiple data centers. However, Interior Gateway Protocol (IGP) and exterior Border Gateway Protocol (E-BGP) are more often used to route traffic between multiple data centers. IGP refers to the Interior Gateway Protocol, which is an internet protocol used to exchange routing information within an autonomous system. BGP refers to the Border Gateway Protocol that is an interautonomous system routing protocol. BGP is used to exchange routing information for the Internet and is the protocol used between Internet service providers (ISP). An autonomous system is a network or group of networks under a common administration and with common routing policies. BGP is used to exchange routing information for the Internet and is the protocol used between Internet service providers. When BGP is used between autonomous systems (AS), the protocol is referred to as External BGP (E-BGP). If BGP is used to exchange routes within an AS, then the protocol is referred to as Interior BGP (I-BGP).

One type of distributed data center topology comprises a pair of data centers, one of which is active and one of which is a standby data center. In an active/standby topology, applications are hosted on both data centers but only one data center is active at any give time. All traffic goes to the active data center until it fails after which traffic is routed to the standby data center. With DNS routing, there could be a significant delay as DNS record caches are updated to redirect the traffic to the now-active data center. During this period, the data center would be inaccessible to any users. A preferable method to implement an active/standby data center topology is to use the same IP address for both data centers and advertise the IP address with different metrics from each data center location. A metric is a standard of measurement, such as path bandwidth, that is used by routing algorithms to determine the optimal path to a destination. This may be preferable to a DNS solution because it avoids the vulnerabilities of DNS record caching.

Although advertising IP addresses is relatively straight forward, there is a risk that both data centers can be active simultaneously, which is undesirable. Accordingly, there is a great need to enable the standby data center to accurately monitor the health of the active data center such that the standby data center will advertise its IP address only if the active data center is actually down. Further, since routing protocols use various metrics to evaluate what path will be best for traffic to travel, route information will vary depending on the routing algorithm. To aid the process of path determination, it is necessary that the IP address be advertised in a manner that minimizes or eliminates the ambiguity in taking different paths and also minimizes the time it takes to update adjacent routers with the new route information.

What is needed is way to make sure that two data centers are not simultaneously active in an active-standby topology. What is also needed is standby data center that will advertise its IP address only if service by the active data center is interrupted due to a disaster, equipment malfunction or other reason.

DETAILED DESCRIPTION OF EMBODIMENTS OF THE INVENTION

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Figure 1:
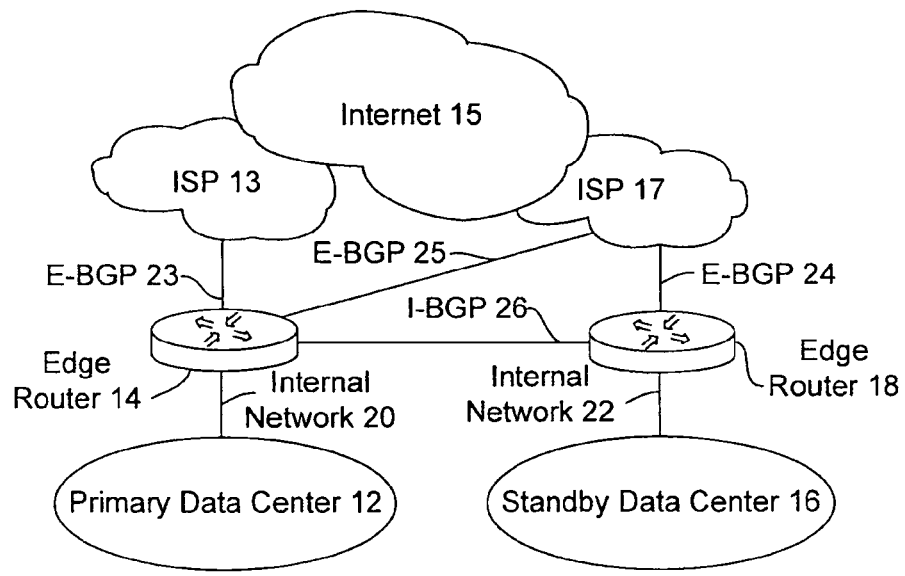
FIG. 1 is a block diagram of an exemplary active/standby data center in accordance with an embodiment of the present invention.

Referring now to the drawings more particularly by reference numbers, a simplified block diagram of a representative active/standby data center is shown in FIG. 1. A primary data center 12 interfaces to a first internet service provider (ISP) 13 through edge router 14. ISP 13 is part of the world wide web and can couple to other ISPs through the internet which is represented by internet cloud 15. A standby or standby data center 16 is coupled to a second ISP 17 and to the internet 15 by edge router 18. Together data centers 12 and 16 comprise an autonomous system (AS) having at least two separate data centers one of which is active and the other is in standby. An AS is a network or group of networks under a common administration and with common routing policies. Each AS has a unique identification number (the "AS number") assigned to it to provide for identification worldwide.

Communication between data center 12 and router 14 occurs over internal networks 20 using IGP or, more specifically, the Interior Gateway Protocol. IGP is a well-known protocol that exchanges routing information within the autonomous system. Similarly, standby data center 16 also utilizes IGP to communication with router 18 over internal network 22. Web servers, application servers or other computer resources that are accessible through routers 14 or 18 propagate information by using IGP before BGP advertises routes to the internet.

Interautonomous system routing uses BGP or, more specifically the Exterior Border Gateway Protocol, to exchange routing information for ISPs 13 and 17 and the internet as indicated by E-BGP 23, 24 and 25 links. E-BGP is a routing protocol used to exchange routing information across the internet. This protocol makes it possible for ISPs to connect to each other and for data centers 12 and 16 to connect to more than one ISP and to exchange network routing information with other networks.

Communication between data centers 12 and 16 utilizes Internal BGP or I-BGP between edge routers 14 and 18. It will be appreciated that although BGP is an external protocol, it is preferred that routers 14 and 18, because both are in a common autonomous system, communicate with one another using I-BGP, as indicated by the I-BGP 26 link.

For routers and switches that implement BGP, conditional route advertisement may be used for data center-to-data center recovery in the event of a disaster. One preferred router, by way of example is the Catalyst 6509 router, which is commercially available from Cisco Systems, the assignee of the present invention. In this embodiment, advertisement occurs only if a pre-condition is met. Specifically, router 18 at the standby data center monitors a list of prefixes from the primary data center, and if the prefixes are missing from the BGP table then it advertises a set of specified prefixes. There is no ambiguity because only the standby data center advertises routes. The standby data center learns the list of prefixes on the I-BGP 26 link between the data centers.

A conditional advertisement is configured on both the primary and standby data centers. The conditional advertisement at the primary data center facilitates the conditional advertisement at the standby data center. If the routes are simply redistributed into BGP from IGP and advertised to the I-BGP peer, the standby data center will also advertise the route and this defeats the purpose of conditional advertisement. For this reason, the router at the primary data center advertises the prefix to its I-BGP peer with the community set to "no-export." This setting prevents the standby data center from advertising the route to its E-BGP peer. Also, the prefix is found in the BGP table so the condition required for advertisement is not met.

If both ISPs fail at the primary data center, the conditional advertisement at the primary data center router stops the I-BGP advertisements. This triggers the conditional advertisement at the standby data center router, which then advertises a more specific prefix. This embodiment requires that ISPs 13 and 17 each allow the advertisement of a block of IP addresses obtained from a different service provider.

The BGP conditional advertisement embodiment advertises the same IP address from the standby data center 16 based on certain criteria. As a practical matter, if the data center does not own a block of IP addresses, each ISP must be willing to accept a route that belongs to a different ISP because the same IP address is being advertised from both data centers.

It is preferred that link 26 connecting the primary and standby data centers has sufficient bandwidth to enable the transfer of traffic from the standby data center 16 to the active data center 12. In one preferred embodiment, link 26 is a high bandwidth local area network (LAN). When both ISP links 23 and 25 are down, traffic will be redirected to standby data center 16 through ISP 17. The traffic may then be transferred over link 26 from standby data center 16 to the primary data center 12, unless the active/standby roles are reversed. However, reversing the roles of the data centers may not be desirable if the primary data center is just temporarily disconnected from internet 15.

Figure 2:
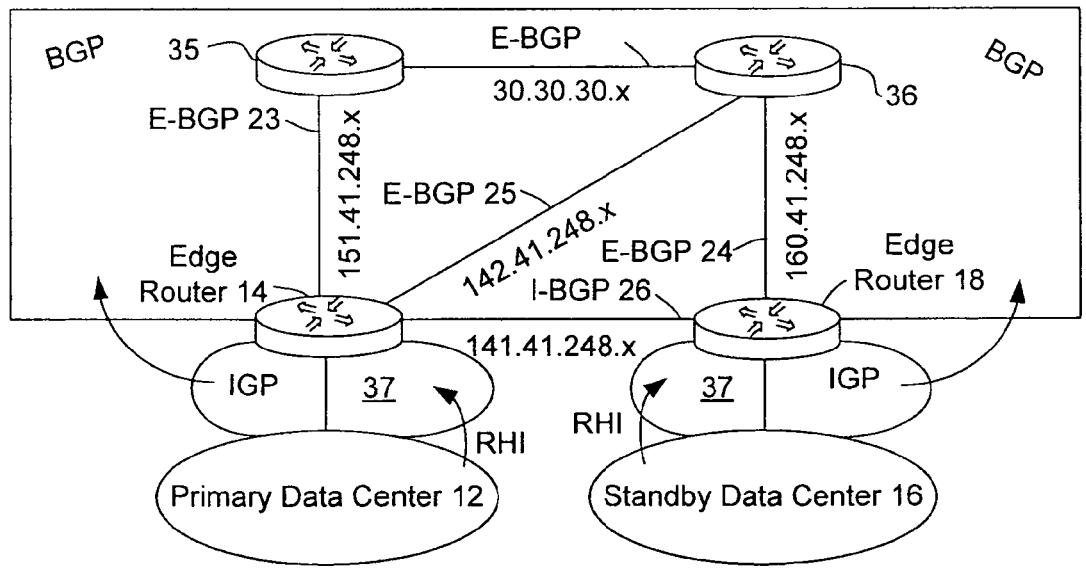
FIG. 2 is another block diagram of an exemplary active/standby data center in accordance with an embodiment of the present invention.

Refer now to FIG. 2 where another simplified block diagram of a representative active/standby data center that illustrates the use of BGP for data center-to-data center recovery in the event of a disaster. In this embodiment, edge routers 14 and 18 are coupled to ISP routers 35 and 36 at two different ISPs. A route is injected from data center 12 or 16 and advertised into the enterprise core network 37 using RHI and IGP and redistributed into BGP at the edge router.

Route health injection (RHI) is used on the data center to inject a Virtual IP address (VIP) into the IGP network 20 (22 in standby data center). The data center ensures the servers are operational before injecting the route. Route is removed from IGP in the case all the servers associated with the particular VIP fail. This ensures the presence of route in the IGP and is directly linked with the health of the servers.

The procedure for configuring the data center includes redistributing routes into BGP and then configuring filters to selectively advertise routes to BGP peers as necessary. It is preferred that the topology of the primary data center be multi-homed to two ISPs. This requires, for example, that the BGP MULTI_E$XIT_DISCRIMINATOR (MED) attribute be used to send a lower metric with routing updates to ISP 13 and a higher metric to ISP17 from edge router 14. The MED attribute is used in the BGP tie breaking process when selecting a preferred path to a given address space. In addition, weights must be set to prefer a specific ISP as the next-hop router for outgoing traffic because it is important to control the outbound routes when designing an internet edge topology. Outbound routes determine how the world sees the network topology and, by default, how traffic returns to the data center. Controlling the outbound routes manages the amount of traffic received from different ISPs.

To illustrate, when configuring the primary data center 12, the two ISP neighbors are in two autonomous systems and the IP addresses are 151.41.248.129 and 142.41.248.130 respectively. The primary data center is in a third autonomous system and has an I-BGP connection to router 18 in the standby data center 16. This is shown in the configuration of Table 1 where the standby data center is configured as the third autonomous system (AS 3).

TABLE 1

```
router bgp 3
    bgp log-neighbor-changes
    redistribute ospf 1 route-map OspfRouteFilter
    neighbor 141.41.248.130 remote-as 3
    neighbor 142.41.248.130 remote-as 2
    neighbor 151.41.248.129 remote-as 1
    no auto-summary
!
```

As shown in Table 1, the OSPF routes are redistributed into BGP using the redistribute command. OSPF refers to the Open Shortest Path First link-state protocol that builds and calculates the shortest path to all known destinations and manages a link state database that describes the interface and relationship of a router to its neighboring routers. A description of the interface may include the IP address of the interface, network type and the routers connected to that network.

Two different methods are preferred when using BGP conditional advertisement. The first method is to use the advertise-map command while the second method is to use the aggregate-address and supress-map commands. Both methods conditionally advertise routes based on the availability of routes in the BGP table. The difference between the two methods is that the two IP addresses are the same when using the advertise-map command while they are different when using the aggregate-address and supress-map commands.

Figure 3:
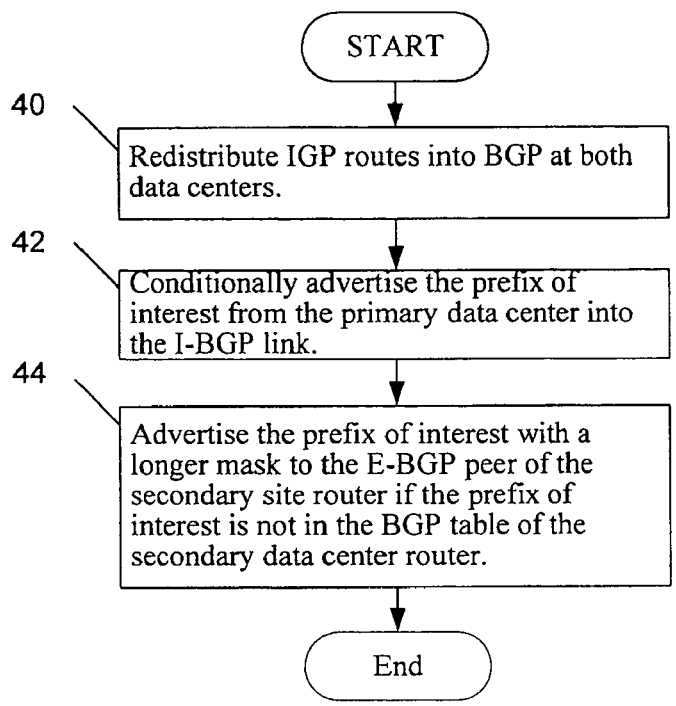
FIG. 3 is a flow diagram illustrating the use of conditional advertising to route traffic to the standby data center when the active data center is not available in accordance with an embodiment of the present invention.

To implement BGP conditional advertisement using the advertise-map command, the steps illustrated in FIG. 3 must be completed. As shown in step 40 the IGP routes are redistributed into BGP at both sites. Then, the prefix of interest from the primary data center into the I-BGP link is conditionally advertised as indicated in step 42. In step 44, the prefix of interest is advertised with a longer mask (more specific route) to the E-BGP peer of the standby data center router 18 if the prefix of interest (that is, the active data center 18) is not in the BGP table of the standby data center router 18.

Figure 4:
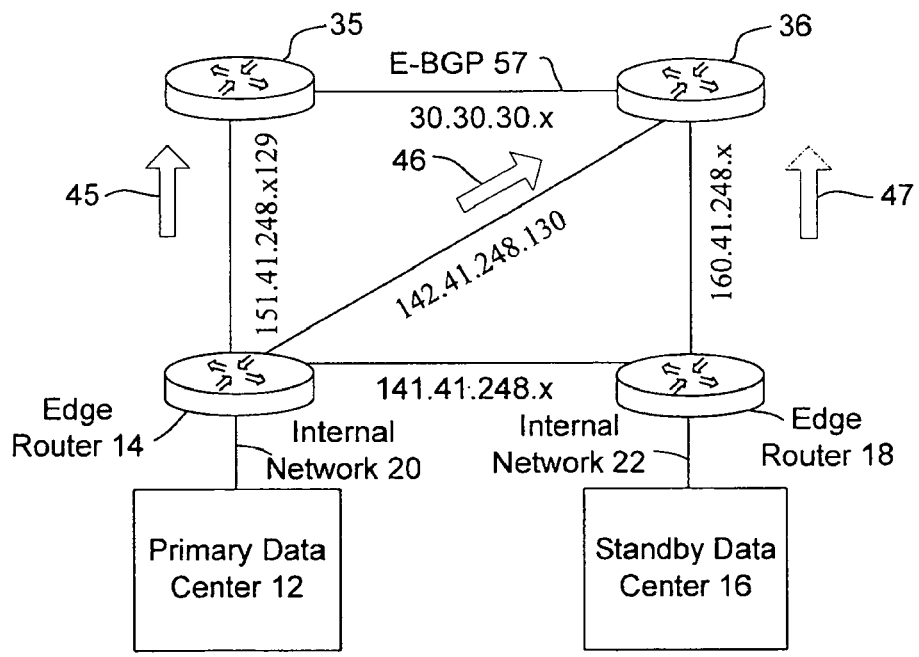
FIG. 4 is a block diagram illustrating the use of conditional advertising for using the standby data center when the active data center is not available in accordance with an embodiment of the present invention.

FIG. 4 illustrates BGP conditional advertising for two different data centers. In FIG. 4, advertising arrows 45 and 46 represent the BGP route advertisement while advertising arrow 47, shown in dashed outline, represents the BGP conditional advertisement.

One representative configuration for the primary data center configuration is shown in Table 2.

TABLE 2

```
router bgp 3
    no synchronization
    bgp log-neighbor-changes
    network 142.41.248.128 mask 255.255.255.192
    network 151.41.248.128 mask 255.255.255.192
    redistribute ospf 1 route-map OspfRouteFilter
    neighbor 141.41.248.130 remote-as 3
    neighbor 141.41.248.130 next-hop-self
    neighbor 141.41.248.130 send-community
    neighbor 141.41.248.130 advertise-map ADV exist-map NON
    neighbor 142.41.248.130 remote-as 2
    neighbor 142.41.248.130 distribute-list 10 out
    neighbor 151.41.248.129 remote-as 1
    neighbor 151.41.248.129 distribute-list 10 out
    no auto-summary
!
```

Although not required, one preferred embodiment utilizes redundant links for the I-BGP connection (see FIG. 1) as is well understood in the art. Further, this embodiment uses interface IP addresses rather than loopback IP addresses for E-BGP and I-BGP peering for this disaster recovery embodiment. Further still, if RHI is used, routes will show up as E 2 routes in the routing table but with BGP, the specific type of route must be identified when redistributing routes. However, if prefix lists or distribute lists are used in the configuration, the route type does not matter.

The BGP conditional advertisement will utilize the distribute-list command for each neighbor to prevent unwanted routes from being advertised. The neighbor 141.41.248.130 send-community command advertises the prefix with the community. This community is used at the standby site router to make decisions about advertising the prefix. Because it is not desirable to advertise this route to the E-BGP peer of the secondary router, set the community to no-export using the commands in Table 3:

TABLE 3

```
route-map ADV permit 10
    match ip address prefix-list Adv
    set community no-export
!
```

The second route map and the prefix-lists, Non and Adv, are shown in Table 4:

TABLE 4

```
route-map NON permit 10
    match ip address prefix-list Non
!
ip prefix-list Adv seq 5 permit 20.20.0.0/16
!
ip prefix-list Non seq 10 permit 142.41.248.128/26
ip prefix-list Non seq 15 permit 151.41.248.128/26
!
```

The prefix of interest in this embodiment is 20.20.0.0/16 and the distribute list refers to an access-list, which has a list of all the prefixes that have to be filtered as illustrated in Table 5.

TABLE 5 access-list 10 deny 3.3.3.0
access-list 10 permit 20.20.20.0
access-list 10 permit 130.34.0.0
access-list 10 permit 142.41.0.0
access-list 10 permit 151.41.0.0
access-list 10 permit 130.34.0.0 0.0.255.255

A similar configuration for the standby data center is illustrated in Tables 6 through 11. Initially, a conditional advertisement must be configured on the standby router as illustrated in Table 6.

TABLE 6 router bgp 3
    no synchronization
    bgp log-neighbor-changes
    redistribute ospf 1 route-map OspfRoutes
    neighbor 141.41.248.129 remote-as 3
    neighbor 141.41.248.129 next-hop-self
    neighbor 141.41.248.129 distribute-list 11 out
    neighbor 160.41.248.130 remote-as 2
    neighbor 160.41.248.130 distribute-list 2 out
    neighbor 160.41.248.130 advertise-map ADV non-exist-map NON
    no auto-summary
!

Route maps, distribute lists, and prefix lists can all be used at the standby data center to control redistribution and peer advertisements. The conditional advertisement is provided by the command:

neighbor 160.41.248.130 advertise-map ADV non-exist-map NON

This command advertises the prefix specified in ADV, if the prefix is missing from the NON route map. The route map configuration is shown in Table 7:

TABLE 7 route-map NON permit 10
    match ip address prefix-list Non
!
route-map ADV permit 10
    match ip address prefix-list Adv
!

The prefix list configuration is shown in Table 8:

TABLE 8 ip prefix-list Adv seq 5 permit 20.20.20.0/24
!
ip prefix-list Non seq 10 permit 20.20.0.0/16
!

The prefix in the list, Non, represents the advertisement from the primary. If this prefix is missing from the BGP table, the prefix specified in Adv is advertised. Thre prefix in Adv is more specific than the prefix in Non.

The configuration for redistribution of OSPF routes into BGP is shown in Table 9.

TABLE 9 ip prefix-list DR-Applications seq 10 permit 140.36.0.0/16 le 32
ip prefix-list DR-Applications seq 15 permit 140.40.0.0/16 le 32
ip prefix-list DR-Applications seq 20 permit 20.20.0.0/16 le 32
ip prefix-list DR-Applications seq 25 deny 10.10.0.0/16 le 32
!
route-map OspfRoutes permit 10

TABLE 9-continued match ip address prefix-list DR-Applications
!

It is necessary that the OSPF weight be modified at the standby site when redistributing routes into BGP so it will not take precedence over a route learned from I-BGP peer. The required commands are shown in Table 10:

TABLE 10 route-map OspfRoutes permit 10
    match ip address prefix-list DR-Applications
    set weight 0
!

The BGP tables on the ISP routers are shown in Table 11:

TABLE 11

72k-ISP2#sh ip bgp
BGP table version is 140, local router ID is 160.41.248.130
Status codes: s suppressed, d damped, h history, * valid, > best,
        i - internal,r RIB-failure, S Stale
Origin codes: i - IGP, e - EGP, ? - incomplete

| | Network | Next Hop | Metric LocPrf | Weight Path |
|---|---|---|---|---|
| * | 20.20.0.0/16 | 30.30.30.129 | | 0 1 3 ? |
| *> | | 142.41.248.129 | 20 | 0 3 ? |
| * | 130.34.248.128/26 | 30.30.30.129 | | 0 1 3 ? |
| *> | | 142.41.248.129 | 12 | 0 3 ? |
| *> | 142.41.248.128/26 | 0.0.0.0 | 0 | 32768 i |
| *> | 160.41.248.128/26 | 0.0.0.0 | 0 | 32768 i |

72k-ISP2#

The standby site does not advertise the prefix of interest as long as the ISP links to the primary site are up. BGP points to the primary site as the best path. The other path that was learned on the ISP router was over the link between the two ISPs. When one ISP at the primary site goes down, the conditional advertisement is not triggered at the standby site. Table 12 shows the BGP table at a second ISP when one of the ISPs is down at the primary site:

TABLE 12

72k-ISP2#sh ip bgp
BGP table version is 140, local router ID is 160.41.248.130
Status codes: s suppressed, d damped, h history, * valid, > best,
        i - internal,r RIB-failure, S Stale
Origin codes: i - IGP, e - EGP, ? - incomplete

| | Network | Next Hop | Metric LocPrf | Weight Path |
|---|---|---|---|---|
| *> | 20.20.0.0/16 | 142.41.248.129 | 20 | 0 3 ? |
| *> | 130.34.248.128/26 | 142.41.248.129 | 12 | 0 3 ? |
| *> | 142.41.248.128/26 | 0.0.0.0 | 0 | 32768 i |
| *> | 160.41.248.128/26 | 0.0.0.0 | 0 | 32768 i |

Table 13 shows the BGP table when both ISP links to the primary site go down:

TABLE 13

72k-ISP2#sh ip bgp
BGP table version is 102, local router ID is 160.41.248.130
Status codes: s suppressed, d damped, h history, * valid, > best,
        i - internal, r RIB-failure, S Stale
Origin codes: i - IGP, e - EGP, ? - incomplete

| | Network | Next Hop | Metric LocPrf | Weight Path |
|---|---|---|---|---|
| *> | 20.20.20.0/24 | 160.41.248.129 | 20 | 0 3 ? |
| *> | 160.41.248.128/26 | 0.0.0. | 0 | 32768 i |

Figure 5:
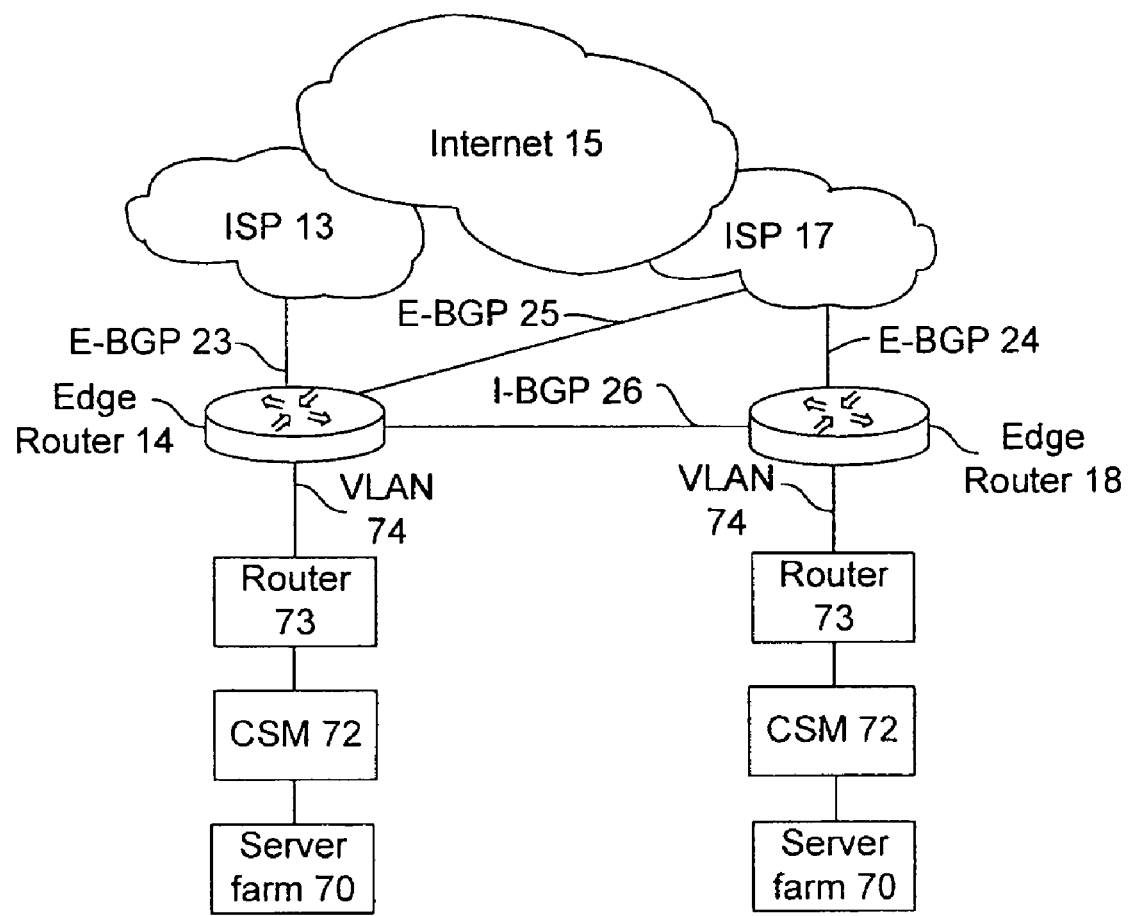
FIG. 5 is a block diagram illustrating another embodiment of an active/standby data center in accordance with an embodiment of the present invention.

Refer now to FIG. 5 where the data centers are shown in more detail. Specifically, each data center 12 and 16 comprise a plurality of servers, which are often collectively referred to as server farms 70 coupled to edge routers 14 and 18 by a Content Switching Module or CSM 72 commercially available from Cisco Systems. CSM 72 is primarily responsible for load balancing client requests to access one of the servers or other computer resource in server farm 70. Typically, each server farm 70 is a replica of the other server farm in order to provide the intended services in an uninterrupted fashion. For each of the embodiments described above, RHI is used on the CSM 72 to inject routes in the adjacent router based on the servers availability.

RHI is activated at the active data center using the "advertise active" command available with virtual servers. This command tells CSM 72 to install a host route in router 73 only if the virtual server is in an operational state. A virtual server is in the operational state when at least one of the servers in the same server farm is operational. Extensive probing is available on the CSM to check the health of the server and the appropriate application daemon that runs on the server. The advertise active will introduce a static route into router 73 using non-protocol messages and the router then advertises this into the IGP and the edge router picks up this route via IGP.

For RHI to work, both the adjacent router 73 and CSM 72 should share a client-side VLAN 74, which is referred to as VLAN26 in the configuration example shown in Table 14. In one preferred embodiment, the router and the CSM co-exist in the same chassis, such as in the Cisco Catalyst 6000 series router, to minimize compatibility issues when CSM installs a host route into the router using a protocol-independent message. However, in other preferred embodiments, it is possible to install a host route from a load balancer that does not share the same chassis. In such instance, the load balancer may use a secondary channel to install a new host route or remove a route when servers are no longer available using a messaging scheme. Alternatively, if the load balancer supports the routing protocol, it may utilize an IP connection to remove a route or to install a new route in router 73.

TABLE 14

```
module ContentSwitchingModule 4
vlan 14 server
    ip address 130.34.248.161 255.255.255.192
!
vlan 26 client
    ip address 10.16.0.2 255.255.255.0
    gateway 10.16.0.1
    alias 10.16.0.3 255.255.255.0
!
probe ICMP icmp
    interval 5
    retries 2
!
    serverfarm RHI-TEST
        nat server
        no nat client
        real 130.34.248.129
            inservice
        probe ICMP
!
    vserver RHI-TEST-1
        virtual 24.24.24.1 tcp www
        vlan 26
        serverfarm RHI-TEST
        advertise active
        persistent rebalance
        inservice
!
    vserver RHI-TEST-2
        virtual 24.24.24.2 tcp www
        vlan 26
```

TABLE 14-continued

```
        serverfarm RHI-TEST
        advertise active
        persistent rebalance
        inservice
!
    vserver RHI-TEST-3
        virtual 24.24.24.3 tcp www
        vlan 26
        serverfarm RHI-TEST
        advertise active
        persistent rebalance
        inservice
!
    ft group 1 vlan 5
        priority 110
!
cat6K_l#
```

Table 15 is the configuration on the interface on the MSFC that connects to the CSM.

TABLE 15

```
cat6K_l#sh run int vlan 26
Building configuration...
Current configuration : 60 bytes
!
interface Vlan26
    ip address 10.16.0.1 255.255.255.0
end
cat6K_l#
cat6K_l#sh mod c 4 vlan id 26 detail
vlan IP address IP mask type
-----------------------------------------------------
26 10.16.0.2 255.255.255.0 SERVER
    ALIASES
    IP address IP mask
    ---------------------------------
    10.16.0.3 255.255.255.0
cat6K_l#
```

The following Table 16 shows the injected static route in the MSFC routing table pointing to the Alias on the CSM. An alias is a shared IP address, similar to a Hot Standby Router Protocol (HSRP) group IP address.

TABLE 16

```
cat6K_l#cat6K_l#sh ip route static
    24.0.0.0/32 is subnetted, 3 subnets
S       24.24.24.1 [1/0] via 10.16.0.3, Vlan26
S       24.24.24.2 [1/0] via 10.16.0.3, Vlan26
S       24.24.24.3 [1/0] via 10.16.0.3, Vlan26
cat6K_l#
```

Accordingly, the present invention provides the architecture and topology of two data centers with at least one active data center connected to multiple Internet Service Providers. It will be apparent to one of skill in the art that other architectures or topologies may be successfully employed and the described embodiments are not intended to be limiting. Further, although the present embodiments are described in terms of a distributed data center, other networks or network systems may use the invention to provide disaster recovery.

Although the invention has been described with respect to specific embodiments thereof, these embodiments are merely illustrative, and not restrictive of the invention. For example, the network may include different routers, switches, servers and other components or devices that are common in such networks. Further, these components may comprise software algorithms that implement connectivity functions between the network device and other devices in a manner different from that described herein.

The executable code described herein may be implemented in any suitable programming language to implement the routines of the present invention including C, C++, Java, assembly language, etc. Different programming techniques can be employed such as procedural or object oriented. The routines can operate in an operating system environment or as stand-alone routines occupying all, or a substantial part, of the system processing.

In the description herein, specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. For example, although the embodiments are described in terms of a router and specifically a Cisco 6500 Catalyst router, other routers from Cisco or other manufacturers, aggregators or network switches may be used. In other instances, well-known structures, materials, or operations are not specifically shown or described in detail to avoid obscuring aspects of embodiments of the present invention.

As used herein the various databases, application software or network tools may reside in one or more server computers and more particularly, in the memory of such server computers. As used herein, "memory" for purposes of embodiments of the present invention may be any medium that can contain, store, communicate, propagate, or transport the program for use by or in connection with the instruction execution system, apparatus, system or device. The memory can be, by way of example only but not by limitation, an electronic, magnetic, optical, electromagnetic, infrared, or semiconductor system, apparatus, system, device, propagation medium, or computer memory.

Reference throughout this specification to "one embodiment," "an embodiment," or "a specific embodiment" means that a particular feature, structure, or characteristic described in connection with the embodiment is included in at least one embodiment of the present invention and not necessarily in all embodiments. Thus, respective appearances of the phrases "in one embodiment," "in an embodiment," or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A stand-by network device comprising:
   a first interface to receive a list of prefixes from a primary network device of a primary data center, the list of prefixes being storable in a gateway table accessible to the stand-by network device, the first interface being configured to receive a prefix from the primary network device over an internal BGP data link; and
   a second interface to advertise a secondary prefix to at least one of a plurality of internet service providers, if a prefix is missing from the list of prefixes storable in the gateway table accessible to the stand-by network device and received from the primary network device over the internal BGP data link.

2. The stand-by network device of claim 1 wherein the secondary prefix is a more specific prefix.

3. The stand-by network device of claim 1 wherein the secondary prefix is a prefix with a longer mask.

4. The stand-by network device of claim 1 wherein the stand-by network device is a network switch.

5. The stand-by network device of claim 1 wherein the stand-by network device is a router.

6. The stand-by network device of claim 1 wherein the first interface being configured to receive a prefix having a 'without export' setting from the primary network device.

7. The stand-by network device of claim 1 wherein the second interface being configured to advertise the secondary prefix using an advertise-map command.

8. A method comprising:
receiving a list of prefixes from a primary network device of a primary data center, the list of prefixes being storable in a gateway table accessible to a stand-by network device, the stand-by network device being configured to receive a prefix from the primary network device over an internal BGP data link; and
advertising a secondary prefix to at least one of a plurality of internet service providers, if a prefix is missing from the list of prefixes storable in the gateway table accessible to the stand-by network device and received from the primary network device over the internal BGP data link.

9. The method of claim 8 wherein the secondary prefix is a more specific prefix.

10. The method of claim 8 wherein the secondary prefix is a prefix with a longer mask.

11. The method of claim 8 wherein the stand-by network device is a network switch.

12. The method of claim 8 wherein the stand-by network device is a router.

13. The method of claim 8 including receiving a prefix having a 'without export' setting from the primary network device.

14. The method of claim 8 including advertising the secondary prefix using an advertise-map command.

15. An apparatus comprising:
means for receiving a list of prefixes from a primary network device of a primary data center, the list of prefixes being storable in a gateway table accessible to a stand-by network device, the stand-by network device being configured to receive a prefix from the primary network device over an internal BGP data link; and
means for advertising a secondary prefix to at least one of a plurality of internet service providers, if a prefix is missing from the list of prefixes storable in the gateway table accessible to the stand-by network device and received from the primary network device over the internal BGP data link.

* * * * *